Aug. 29, 1961       D. COHN       2,997,811
DOLL'S HEAD AND NOVEL MEANS FOR MOUNTING THE EYES IN
POSITION AT THE EYE OPENINGS
Filed Feb. 9, 1959        2 Sheets-Sheet 1

INVENTOR.
DAVID COHN

BY  *Clark + Ott*

ATTORNEYS

Aug. 29, 1961  D. COHN  2,997,811
DOLL'S HEAD AND NOVEL MEANS FOR MOUNTING THE EYES IN
POSITION AT THE EYE OPENINGS
Filed Feb. 9, 1959  2 Sheets-Sheet 2
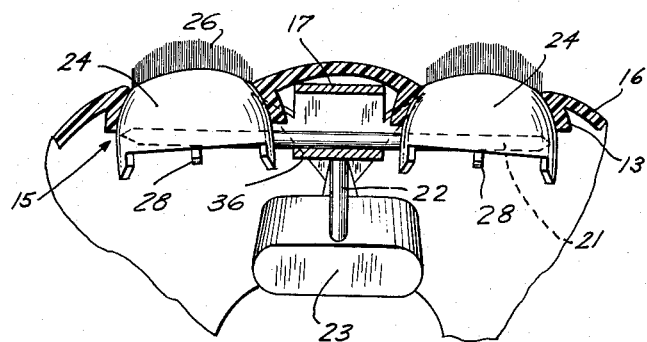
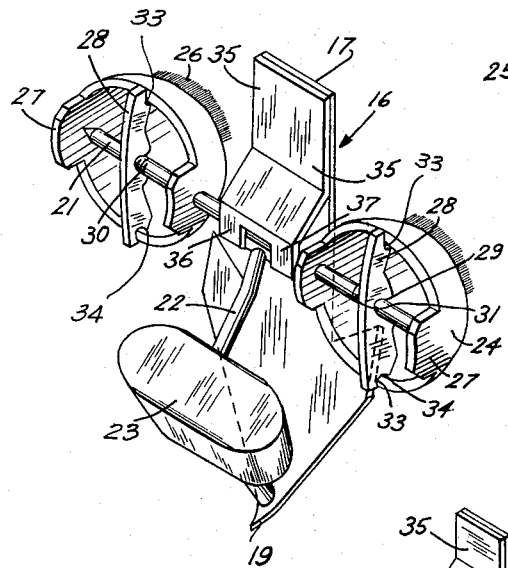
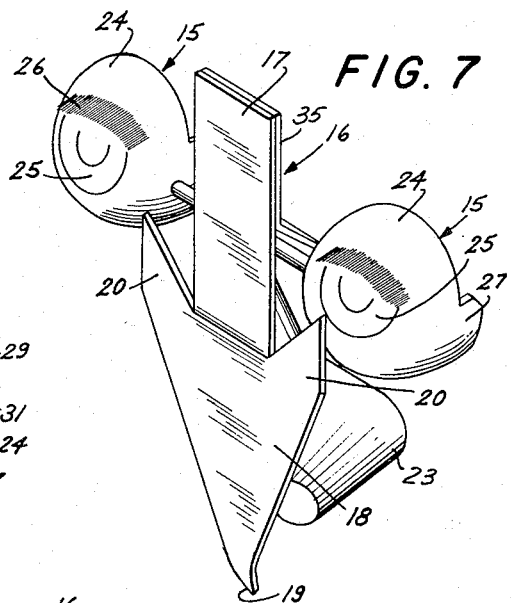
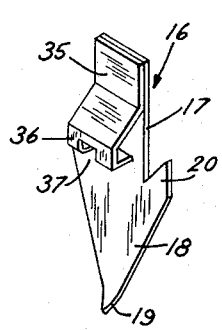
INVENTOR.
DAVID COHN
BY Clark & Ott
ATTORNEYS United States Patent Office 2,997,811
Patented Aug. 29, 1961

2,997,811
DOLL'S HEAD AND NOVEL MEANS FOR MOUNTING THE EYES IN POSITION AT THE EYE OPENINGS
David Cohn, Poundridge, N.Y., assignor to Model Plastic Corporation, White Plains, N.Y., a corporation of New York
Filed Feb. 9, 1959, Ser. No. 792,219
1 Claim. (Cl. 46—169)

This invention relates to dolls' heads and the invention has particular reference to novel means for mounting the eye members in position in the head at the eye openings.

An object of the invention is to provide novel means by which the eye members may be conveniently and expeditiously mounted in position in a doll's head with the eye members located at the eye openings.

A further object of the invention is to provide eye mounting means for a doll's head of integral construction having a neck opening and rims extending inwardly from the front wall of the head at the edges of the eye openings respectively, the eye mounting means being readily insertable in the doll's head through the neck opening and rigidly affixed in position therein with the eye members disposed at the eye openings.

Still another object of the invention is to provide eye mounting means which may be wedged in position between the inwardly directed rims providing the eye openings and the wall of the head adjacent the neck opening to rigidly affix the eye members in position for rocking movement at the eye openings.

Still another object of the invention is to provide mounting means to which the eye members are swingably connected and which means is impinged against portions of the head adjacent the eye and neck opening for securing the eye members in position for rocking movement at the eye openings.

With the foregoing and other objects in view, reference is now made to the following specification and accompanying drawings in which the preferred embodiment of the invention is illustrated.

In the drawings:

FIG. 5 is a fragmentary sectional view taken approximately on line 5—5 of FIG. 2.

FIG. 6 is a rear perspective view of the eye mounting means.

FIG. 7 is a front perspective view of the eye mounting means.

FIG. 8 is a perspective view of the means on which the eye members are swingably mounted.

Figure 1:
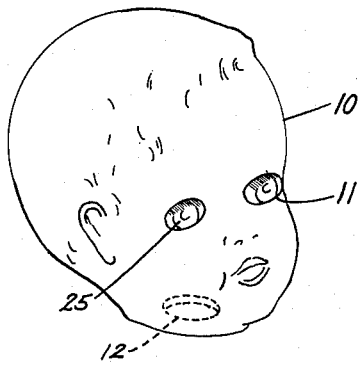
FIG. 1 is a perspective view of a doll's head of unitary construction provided with eye mounting means constructed in accordance with the invention.

Referring to the drawings, mounting means are provided for pivotally mounting the eye members in a doll's head of unitary construction. Dolls' heads of this nature present the problem of affixing the eye members in position after the head has been fully formed and the eye members together with the mounting means therefor must be inserted through the neck opening. This type of doll''s head is formed by molding thermoplastic material and the like to provide a head 10 of hollow formation having eye openings 11, a neck opening 12 and rims 13 extending inwardly from the front wall of the head at the edges of the eye openings respectively. The rims 13 are of arcuate formation in section extending peripherally about the eye openings so as to form sockets within the head with the eye openings 11 located substantially at the centers thereof respectively. The eye mounting means 14 pivotally supporting the eye members 15 permits of the convenient insertion thereof through the neck opening 12 and the attachment thereof to the head so as to dispose the eye members in position at the eye openings.

The eye mounting means 14 includes a metal plate 16 having a narrow upper portion 17 disposed in upright relation between the rims 13 and with a lower portion 18 formed with a sharpened lower end 19 and sharpened side projectcions 20. The sharpened lower end 19 is curved slightly inwardly and the side projections 20 extend upwardly and outwardly at the sides of the plate 16. The plate provides a support for the eye members 15 which are affixed to a cross shaft 21 and attached to said shaft centrally thereof is a lever arm 22 having a weight 23 mounted on the outer end thereof. The weight 23 is disposed against the lower end of the plate when the doll is in upward relation to thereby maintain the eye members in open relation at the eye openings 12 and the weight functions to prevent turning movement of the eye members with the movement of the head from upright relation to horizontal relation.

The plate 16 together with the eye members and the weight are insertable through the neck opening 12 and by manual pressure against the plate 16, the same is disposed against the forward wall of the doll and is wedged in position between the rims 13 and between the rims and the bottom wall of the head. The pointed extremities of the sharpened lower end 19 and projections 20 are embedded in the said walls to thereby attach the plateto the doll's head with the eye members slidably fitting the sockets formed by the rims.

The eye members 15 consist of semi-spherical shells 24 having openings in the forward portions thereof with eye elements 25 secured in the shells at said openings which are colored to simulate eyes. Above the eye elements, eyelashes 26 are provided which are secured within the shell between the same and the eye elements. The cross shaft 21 is tapered at its ends and extends through the inner side walls of the shells with the tapered ends embedded in the outer side walls thereof. The shells are provided with rearwardly directed extensions 27 where the shaft engages the shells.

Figure 3:
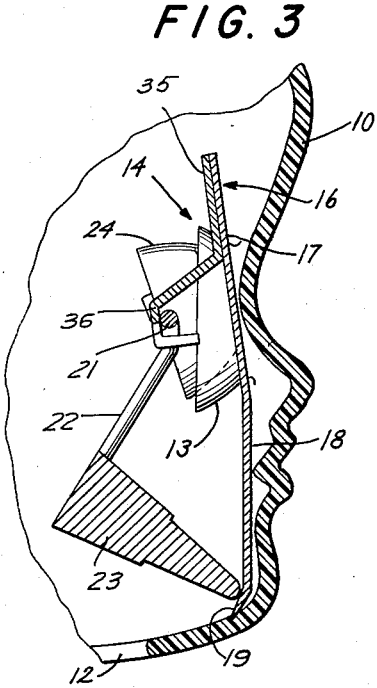
FIG. 3 is an enlarged fragmentary sectional view taken approximately on line 3—3 of FIG. 2.
Figure 2:
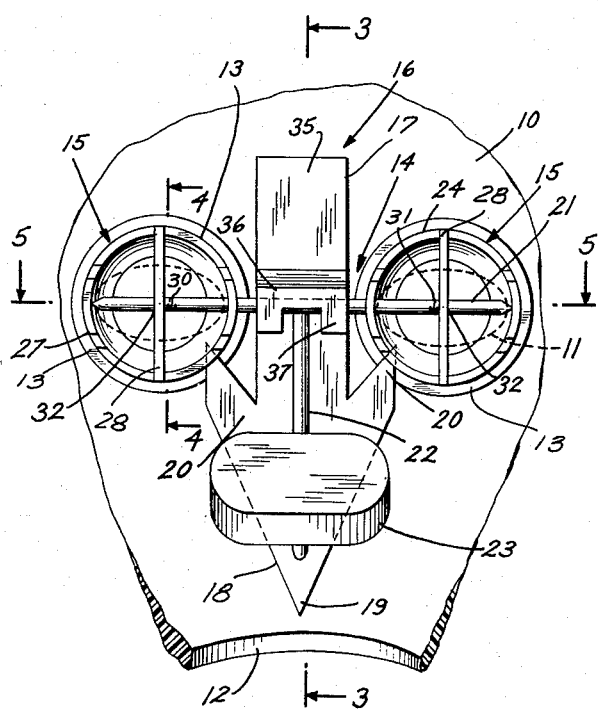
FIG. 2 is an enlarged fragmentary view of a portion of a doll's head showing the eye mounting means in position.
Figure 4:
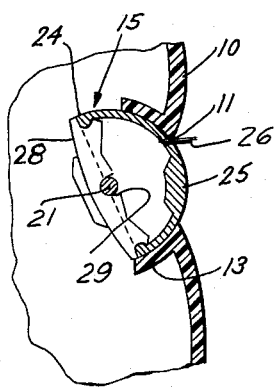
FIG. 4 is a fragmentray sectional view taken approximately on line 4—4 of FIG. 2.

In order to rigidly affix the eye members to the cross shaft, securing elements 28 are provided which are recessed as at 29 in the forward edges thereof in which are received threaded portions 30 and 31 of the shaft respectively. These portions are right and left hand threaded and when the shaft is assembled with the eye members, the shaft is rotated so as to tighten the securing elements against the inner faces of the shells and against shoulders 32 on the cross shaft formed by the threaded portions thereof. The securing elements are notched at their ends as at 33 and are formed with sharpened extremities 34 inwardly of the notched portion which are embedded in the inner faces of the shells with the notched portions engaging over the inner edges thereof for securely fastening the attaching elements thereto intermediate the projections 27 of the shells respectively. The cross shaft extends through a tunnel provided on the metal plate 16 which tunnel is formed by a strap 35 welded or otherwise affixed to the narrow upper portion 17 thereof with the lower end of the strap bent into hook shaped formation as at 36 in FIGS. 3 and 6 of the drawings. The lower portion of the strap is bifurcated as at 37 to freely receive the lever arm 22 for swinging movement therebetween.

While the preferred form of the invention is shown and described herein, it is to be understood that the same is not so limited but shall cover and include any and all modifications thereof which fall within the purview of the invention.

What is claimed is:

The combination of a doll's head of hollow formation having a neck opening and eye openings with rims formed integrally with said head and extending inwardly from the front wall at the edges of the eye openings respectively and eye mounting means insertable in the doll's head through the neck opening and including eye members, a shaft on which said eye members are affixed, a lever arm affixed to said shaft substantially centrally between the ends thereof, a weight affixed to the outer end of said lever arm for retaining the eye members against rocking movement with the movement of the head from upright relation to horizontal relation, a member including a narrow upper portion and a triangular shaped lower portion arranged in position between the rims and the bottom wall of the head to dispose said narrow upper portion in upwardly extending relation between said rims, means mounting said shaft on said narrow upper portion to dispose said eye members at said eye openings in said rims respectively, said triangular shaped lower portion having oppositely disposed extremities with upwardly extending sharpened points at its upper extremity and a downwardly extending sharpened point at its lower extremity and said upwardly extending points being embedded in the walls of said rims respectively and said downwardly extending point being embedded in the bottom wall of the head to thereby secure said member in position in the doll's head.

References Cited in the file of this patent

UNITED STATES PATENTS

| | | |
|---|---|---|
| 1,047,259 | Manning | Dec. 17, 1912 |
| 1,809,053 | Marcus et al. | June 9, 1931 |
| 1,819,035 | Nemcovsky | Aug. 18, 1931 |
| 1,874,762 | Konoff | Aug. 30, 1932 |
| 1,999,726 | Grubman | Apr. 30, 1935 |
| 2,618,898 | Wilhelm | Nov. 25, 1952 |